(12) United States Patent
Hyttinen et al.

(10) Patent No.: US 10,178,325 B2
(45) Date of Patent: Jan. 8, 2019

(54) METHOD AND SYSTEM FOR MANAGING VIDEO OF CAMERA SETUP HAVING MULTIPLE CAMERAS

(71) Applicant: Oy Vulcan Vision Corporation, Helsinki (FI)

(72) Inventors: Jussi Hyttinen, Berlin (DE); Mikko Välimäki, Tampere (FI); Hannu Eronen, Vantaa (FI); Asko Roine, Espoo (FI)

(73) Assignee: Oy Vulcan Vision Corporation, Helsinki (FI)

( * ) Notice: Subject to any disclaimer, the term of this patent is extended or adjusted under 35 U.S.C. 154(b) by 267 days.

(21) Appl. No.: 15/000,139

(22) Filed: Jan. 19, 2016

(65) Prior Publication Data
US 2016/0227127 A1    Aug. 4, 2016

Related U.S. Application Data

(60) Provisional application No. 62/105,165, filed on Jan. 19, 2015, provisional application No. 62/248,066, filed on Oct. 29, 2015.

(51) Int. Cl.
*H04N 5/247* (2006.01)
*H04N 5/77* (2006.01)
(Continued)

(52) U.S. Cl.
CPC ............. *H04N 5/247* (2013.01); *G01B 11/14* (2013.01); *H04N 5/2252* (2013.01); *H04N 5/77* (2013.01); *H04N 9/8205* (2013.01)

(58) Field of Classification Search
CPC ........ H04N 5/247; H04N 5/2252; H04N 5/77; G01B 11/14
See application file for complete search history.

(56) References Cited

U.S. PATENT DOCUMENTS

| 6,052,539 A | 4/2000 | Latorre |
| 6,522,325 B1 | 2/2003 | Sorokin et al. |
| (Continued) | | |

FOREIGN PATENT DOCUMENTS

| CN | 102323854 | | 1/2012 | |
| WO | WO 2014/114754 | * | 7/2014 | ............. G08G 1/164 |
| WO | 2015142174 | | 9/2015 | |

OTHER PUBLICATIONS

International Application No. PCT/US2016/059783, International Search Report and Written Opinion dated Jan. 19, 2017.
(Continued)

*Primary Examiner* — Mishawn N Hunter
(74) *Attorney, Agent, or Firm* — Sheppard, Mullin, Richter & Hampton LLP

(57) ABSTRACT

Disclosed are a system and a method for managing a set of videos originating from a camera setup having a plurality of cameras. The system and method provides a mesh of graphical elements superposed with an active video at a display of a user device. The graphical elements are arranged on a virtual surface representing positions of the cameras in a co-ordinate system. The active video originates from the at least one camera, which at least one camera is associated with the graphical element located in the middle portion of the display. In addition, the present disclosure enables correlating relative position, recording direction and order of the multiple cameras for providing multiple viewing positions, for example, on a user interface.

21 Claims, 12 Drawing Sheets

(51) Int. Cl.
  *G01B 11/14* (2006.01)
  *H04N 5/225* (2006.01)
  *H04N 9/82* (2006.01)

(56) References Cited

U.S. PATENT DOCUMENTS

| | | | |
|---|---|---|---|
| 6,535,226 B1 | 3/2003 | Sorokin et al. | |
| 6,624,853 B1* | 9/2003 | Latypov | H04N 5/222 |
| | | | 348/584 |
| 6,990,681 B2* | 1/2006 | Wang | H04N 5/222 |
| | | | 348/143 |
| 7,084,904 B2 | 8/2006 | Liu et al. | |
| 7,264,554 B2 | 9/2007 | Bentley | |
| 7,286,143 B2 | 10/2007 | Kang et al. | |
| 7,292,257 B2 | 11/2007 | Kang et al. | |
| 7,613,999 B2 | 11/2009 | Sorokin et al. | |
| 7,646,404 B2 | 1/2010 | Liu et al. | |
| 7,693,702 B1* | 4/2010 | Kerner | G06T 19/006 |
| | | | 345/629 |
| 7,843,497 B2 | 11/2010 | Conley | |
| 7,876,353 B2 | 1/2011 | Piccionelli et al. | |
| 8,013,899 B2* | 9/2011 | Gillard | G03B 37/04 |
| | | | 348/157 |
| 8,427,545 B2 | 4/2013 | Porter et al. | |
| 8,432,463 B2 | 4/2013 | Conley | |
| 8,520,054 B2 | 8/2013 | Cox et al. | |
| 2005/0278618 A1* | 12/2005 | Ogikubo | G11B 27/034 |
| | | | 715/255 |
| 2006/0159307 A1 | 7/2006 | Anderson et al. | |
| 2010/0295945 A1 | 11/2010 | Plemons et al. | |
| 2010/0299630 A1 | 11/2010 | McCutchen et al. | |
| 2011/0025853 A1 | 2/2011 | Richardson | |
| 2012/0200665 A1 | 8/2012 | Furumura et al. | |
| 2013/0163817 A1 | 6/2013 | Porter et al. | |
| 2013/0235225 A1 | 9/2013 | Conley | |
| 2014/0132788 A1 | 5/2014 | Ramsay et al. | |
| 2014/0267748 A1 | 9/2014 | Lee | |
| 2015/0249815 A1* | 9/2015 | Sandrew | H04N 13/0271 |
| | | | 348/47 |
| 2015/0365632 A1* | 12/2015 | Eilertsen | G08G 1/164 |
| | | | 348/149 |
| 2016/0127690 A1* | 5/2016 | Kaehler | G06T 19/003 |
| | | | 348/143 |
| 2017/0155888 A1* | 6/2017 | Prechtl | H04N 13/0242 |

OTHER PUBLICATIONS

Aylward, Ryan P., "Sensemble: A Wireless Inertial Sensor for Interactive Dance and Collective Motion Analysis," Masters Thesis, Massachusetts Institute of Technology, Sep. 2006.

Ghasemzadeh, Hassan et al., "Coordination Analysis of Human Movements with Body Sensor Networks: A Signal Processing Model to Evaluate Baseball Swings," IEEE Sensors Journal, vol. 11, No. 3, pp. 603-610, Mar. 2011.

Hsu, Yu-Liang et al., "A Wearable Inertial-Sensing-Based Body Sensor Network for Shoulder Range of Motion Assessment," 2013 International Conference on Orange Technologies (ICOT), pp. 328-331, Mar. 2013.

Karliga, Ibrahim et al., "Analyzing Human Body 3-D Motion of Golf Swing from Single-Camera Video Sequences," 2006 IEEE International Conference on Acoustics, Speech and Signal Processing (ICASSP), vol. 5, May 2006.

Tao, Weijun et al., "Gait Analysis Using Wearable Sensors," Sensors, vol. 12, No. 2, pp. 2255-2283, Feb. 16, 2012.

Wahab, Yufridin et al., "Gait Analysis Measurement for Sport Application Based on Ultrasonic System," 2011 IEEE 15th International Symposium on Consumer Electronics (ISCE), pp. 20-24, Jun. 2011.

* cited by examiner

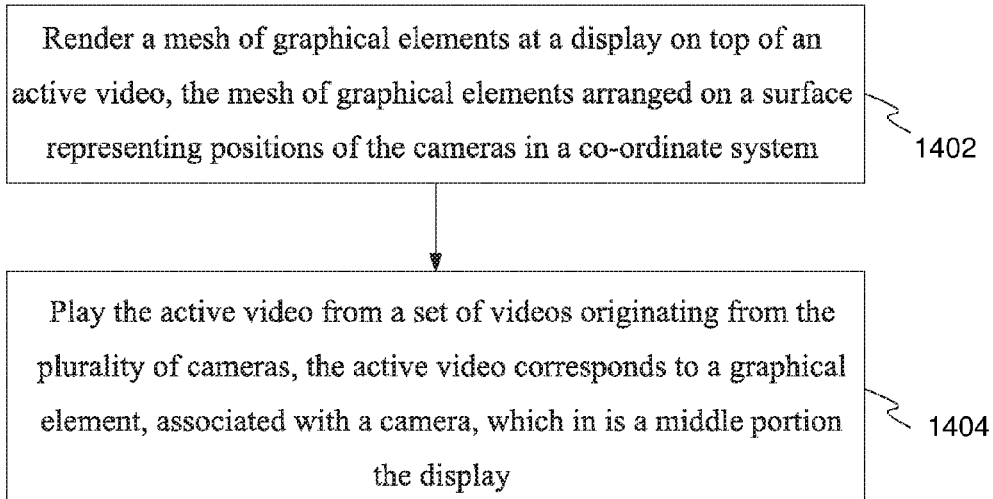

FIG. 13A      FIG. 13B

Render a mesh of graphical elements at a display on top of an active video, the mesh of graphical elements arranged on a surface representing positions of the cameras in a co-ordinate system — 1402

Play the active video from a set of videos originating from the plurality of cameras, the active video corresponds to a graphical element, associated with a camera, which in is a middle portion the display — 1404

FIG. 14

METHOD AND SYSTEM FOR MANAGING VIDEO OF CAMERA SETUP HAVING MULTIPLE CAMERAS

REFERENCE TO RELATED APPLICATION

The present application claims priority benefit under 35 U.S.C. § 119(e) from a U.S. Provisional Application No. 62/105,165, filed Jan. 19, 2015, entitled "METHOD AND SYSTEM FOR MANAGING VIDEO OF CAMERA SETUP HAVING MULTIPLE CAMERAS," and a U.S. Provisional Application No. 62/248,066, filed Oct. 29, 2015, entitled "METHOD AND SYSTEM FOR DETERMINING RELATIVE POSITION OF CAMERAS," which are incorporated herein by reference.

TECHNICAL FIELD

The present disclosure relates generally to managing a video; and more specifically, to methods and systems for managing a video of a camera setup having multiple cameras.

BACKGROUND

In the general field of video transmission and recording, it is common to simultaneously capture video from multiple viewpoints or locations. One common example includes a sports broadcasting event, such as a basketball match or a baseball match, in which a camera setup having multiple cameras are used to capture the action from multiple viewing positions. The multiple cameras may be represented with graphical elements on a user interface (such as a display of a mobile phone) for providing multiple viewing positions.

However, for the camera setup having the multiple cameras (associated with different camera views) it is challenging to navigate from one camera view to another desired camera view. Further, while presenting a video with different camera views, the distances and directions of the videos from a subject point of view need to be reconstructed or edited, which is a time consuming and a challenging task.

Furthermore, in such camera setup it is very challenging to figure out distances and directions of the cameras with respect to the subject to be captured. For example, position and alignment of the cameras (e.g., relative positions there between) around the subject may influence the multiple viewing positions, as the cameras may be positioned in a non-uniform manner around the subject. Moreover, recording direction and order in which the cameras are arranged may also influence the multiple viewing positions. Accordingly, correlating the position, the recording direction and the order in which the cameras are arranged, for providing multiple viewing positions on the user interface, becomes a challenging task.

Therefore, in light of the foregoing discussion, there exists a need to overcome the aforementioned drawbacks of efficiently managing a video of a camera setup having multiple cameras.

SUMMARY

The present disclosure seeks to provide a method for managing a set of videos originating from a camera setup having a plurality of cameras.

The present disclosure also seeks to provide a system for managing a set of videos originating from a camera setup having a plurality of cameras.

In one aspect, an embodiment of the present disclosure provides a system for managing a set of videos originating from a camera setup having a plurality of cameras, the system comprising:
 a server communicably coupled to the plurality of cameras and to a user device by a communication network, the server being operable to
  receive an active video originating from at least one camera of the camera setup,
  provide the active video and camera position information to the user device to be rendered on a display of the user device; and
 a user device operable to
  render a mesh of graphical elements superposable on the active video, the graphical elements being arranged on a virtual surface representing positions of the cameras in a co-ordinate system, and
  superpose the mesh of graphical elements and the active video on the display of the user device,
 wherein the at least one camera is associated with the graphical element located in the middle portion of the display.

In another aspect, an embodiment of the present disclosure provides a method for managing a set of videos originating from a camera setup having a plurality of cameras, the method comprising:
 rendering a mesh of graphical elements on a display of a user device, the graphical elements being arranged on a virtual surface representing positions of the cameras in a co-ordinate system, and
 playing an active video originating from at least one camera of the camera setup on the display,
 wherein the mesh of graphical elements and the active video are superposed on the display, and the active video originates from the at least one camera, which at least one camera is associated with the graphical element located in the middle portion of the display.

Embodiments of the present disclosure substantially eliminate or at least partially address the aforementioned problems in the prior art, and enables in efficiently managing a video of a camera setup having multiple cameras. In addition, the present disclosure enables correlating relative position, recording direction and order of the multiple cameras for providing multiple viewing positions, for example, on a user interface.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIGS. 13A & 13B are schematic illustrations for determining a middle portion of a display of a user device, in accordance with various embodiments of the present disclosure; and FIG. 14 is an illustration of steps of a method for managing a video of a camera setup having a plurality of cameras, in accordance with an embodiment of the present disclosure.

Figure 1:
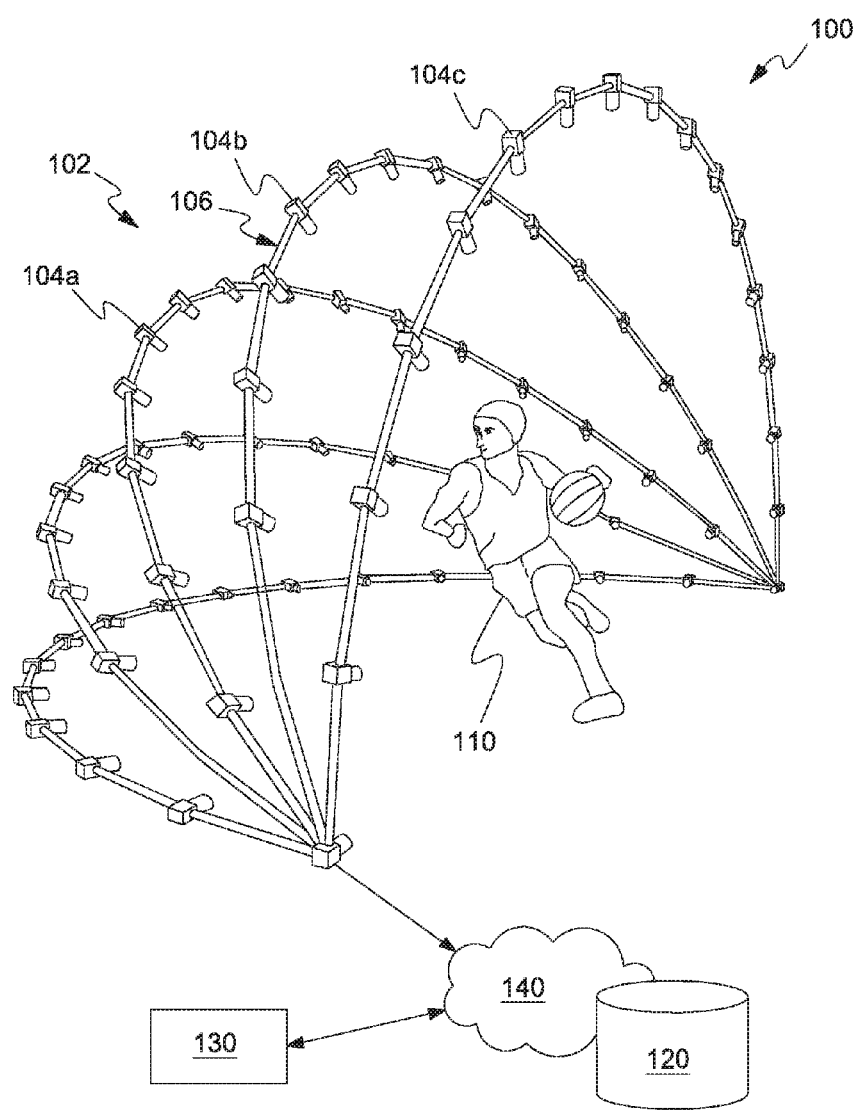
FIG. 1 is a schematic illustration of a system for managing a video of a camera setup having a plurality of cameras, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for managing a set of videos originating from a camera setup having a plurality of cameras, the system comprising:

a server communicably coupled to the plurality of cameras and to a user device by a communication network, the server being operable to receive an active video originating from at least one camera of the camera setup, provide the active video and camera position information to the user device to be rendered on a display of the user device; and a user device operable to render a mesh of graphical elements superposable on the active video, the graphical elements being arranged on a virtual surface representing positions of the cameras in a co-ordinate system, and superpose the mesh of graphical elements and the active video on the display of the user device, wherein the at least one camera is associated with the graphical element located in the middle portion of the display.

In the present description, the server can be a physical computer server, a logical server operable in a cloud service or a logical server operable in at least one user device.

In an embodiment, the system relates to managing (recording and/or playing) a video of a camera setup having a plurality of cameras. The plurality of cameras of the camera setup is configured to record and/or play multiple videos of a subject from different directions and positions within a location. Further, such videos may be provided to a user on a user device having an application installed therein, which is further operable to provide the user an option for selecting and playing at least one recorded video thereon, which will be explained in greater detail herein later.

The system further relates to providing a user interface at the user device for viewing and selecting a video (a camera view associated with a particular camera) from the plurality of cameras of the camera setup. Specifically, the user interface presents the mesh of graphical elements, associated with the directions and distances (spatial positions) of the plurality of cameras with respect to each other and the subject. Each graphical element indicates a camera view (for an active video) that can be seen from a particular camera associated with a particular position. Therefore, by selecting a specific graphical element on the display of the user device, a corresponding camera view can be selected. In an embodiment, the mesh of graphical elements is such that it is fully transparent, i.e. non-visible to human eye. Another option is not to render the mesh of graphical elements on the screen.

The plurality of cameras of the camera setup includes at least a first, a second and a third camera. However, the number of cameras can be tens of cameras (such as, 50 cameras), hundreds of cameras (such as, 500) or even thousands of cameras (such as, 5000 cameras). Further, these cameras are primarily video cameras; however, these cameras can take still images as well.

In an embodiment, the plurality of cameras of the camera setup record videos related to an event taking place within a location. The location can be an open field or an indoor location. The event may be a sports event (for example, a basketball match, a badminton match, a baseball match, a football match, a race and the like), theatrical performances (for example opera, dramatics and the like), live performances (for example, musical band performances, dance performance and/or competition, singing performance and/or competition and award presentations), and the like.

In another embodiment, the plurality of cameras of the camera setup is used in a training situation, such as professional sports training situation. The plurality of cameras of the camera setup can be used in any kind of sports event, such as, for example, a yoga instructor can give instructions to an individual taking a yoga class under the instructor's supervision.

In yet another embodiment, the plurality of cameras of the camera setup may relate to a monitoring purpose of moving subjects. For example, the plurality of cameras of the camera setup can relate to monitoring people within an enclosure, monitoring animal's movement in a zoo and the like. Accordingly, the subject can be players involved in the sports event. Similarly, the subject can be a participant of a bike race, a skier, a golf player, a baseball player, a gymnast and the like. The present system and method may thus be used for example for golf swing training, baseball hitting training, gymnastics training etc. Further, it may be evident to those skilled in the art that the subject should be captured (or recorded) by at least more than one camera (of the plurality of cameras) simultaneously for providing at least more than one view of the subject to the user.

In an embodiment, the plurality of cameras includes cameras used for recording (for broadcasting) of a sports event. The plurality of cameras may further include but not be limited to a portable electronic device, for example, a smart phone with a camera, a phone with a camera, an iPod, an iPad, and a smart camera, such as a digital camera. Further, the at least first, second and third camera of the plurality of cameras are arranged in the location where the event is taking place, such as, in a football stadium for recording videos of the football match.

In another embodiment, the at least first, second and third camera of the plurality of cameras is associated with a user (for example, a spectator, a designated camera person, a stadium staff and the like) who is recording videos of the subject. In an embodiment, each of the plurality of cameras comprises sensors of the set of sensors for measuring an orientation of the at least first, second and third camera of the plurality of cameras, which will be explained in greater detail herein later. In an embodiment, the set of sensors include but may not be limited to magnetometer, gyroscope and accelerometer.

In an embodiment, each of the plurality of cameras also comprises a communication medium, a user interface (such as, display, touch screen, buttons), camera optics (for taking still images and recording video), a microphone, a battery, a location means (such as, GPS sensor) for detecting location of the at least first, second and third camera of the plurality of cameras.

In an embodiment, the user device is configured to display video recorded by the plurality of cameras, based on the user selection. According to an embodiment, there may be two user devices, such as a first user device and a second user device. The first user device is associated with a user watching a recorded video and the second user device is associated with an administrator of the system. In an embodiment, the administrator controls displaying of the videos on the first user device. Specifically, the administrator segregates some videos from the recorded videos based on quality, viewer's demand and the like, and presents the segregated videos first user device thereafter.

In an embodiment, the first user device and the second user device are also communicably coupled to the server (explained in the subsequent paragraphs). Further, the first user device and the second user device can be computing devices. Examples of the computing devices include, but are not limited to, a mobile phone, a smart telephone, a Mobile Internet Device (MID), a tablet computer, an Ultra-Mobile Personal Computer (UMPC), a phablet computer, a Personal Digital Assistant (PDA), a web pad, a personal computer, a laptop, a handheld Personal Computer (PC) and a smart Television (TV).

According to an embodiment, the server is configured to receive the information (i.e. videos or images) from the plurality of cameras and to process it thereafter before sending the information to the user device. Specifically, the server is configured to simultaneously receive all the videos (having different camera views) recorded by the plurality of cameras. In an embodiment, the server may be communicably coupled to a database for storing the information (i.e. videos or images) received from the plurality of cameras. Alternatively, the database may store metadata of each of the plurality of cameras, such as model name, model number and the like. Alternatively, the system could also be established such that no server is needed, i.e. that each camera of the plurality of cameras can perform the function of the server.

The server is communicably coupled to the plurality of cameras and the user device by the communication network, which can be a wired, wireless, or a combination thereof. Examples of such communication network includes, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

In an embodiment, the plurality of cameras may be configured in the location by attaching the plurality of cameras to a frame. The frame may be configured to have various shapes (uniform or arbitrary shape) based on a need of a setup. For example, the frame may be configured to have a dome, a sphere, a hemisphere, a cylinder, an oval, a circular, a polygonal and a combination shape thereof. Accordingly, a camera setup is also configured to have one of a shape mentioned herein. The frame is thus an optional part of the system. The cameras can be also attached to other devices such as camera tripods or to walls etc.

In an example, the camera setup may be configured to have a cuboidal shape, i.e. a length of 15 meters, a width of 10 meters and a height 10 meters, for surrounding a badminton court for managing (recording and/or playing) a video of a badminton match. Similarly, the camera setup may be configured to have a hemispherical shape, i.e. a radius of 20 meters, for surrounding a basketball court for managing (recording and/or playing) a video of a basketball match. The camera setup may also be configured to have a shape suitable for following a gymnast when he/she makes a back-flip or similar move, i.e. a sphere or a quasi-sphere. Similarly, the camera set up may be configured to follow a golf swing training premise.

Further, based on the various camera setups each of the plurality of cameras thereof has different position on a co-ordinate system. In an embodiment, the various positions of the plurality of cameras with respect to each other and with respect to the subject are determined with the help of the server. For example, initially a subject of known dimensions (such as a height, a length and a width), shape (such as cuboidal, spherical and a cylindrical) and color (such as black, red and blue) is placed approximately at a place or a position from where the subject to be captured or filmed.

Thereafter, still images (or video images) of the subject from the plurality of cameras are taken or captured, and forwarded to the server for analysis. The server analyses the still images to determine position for each of the plurality of cameras with respect to the subject and to each other. For example, the server includes an algorithm for determining cameras directions and distances from the subject, i.e. X, Y, Z co-ordinates (in a 3 co-ordinates system) and an altitude of each of the cameras with respect to the subject. The altitude of a camera refers to a direction of the camera, i.e. in which way the camera is directed.

Alternatively, the position (directions and distances) for each of the plurality of cameras with respect to other cameras and the subject is manually determined.

In an embodiment, the plurality of cameras should be calibrated with respect to the subject based on the distances between the cameras and the subject (determined with the help of the server by processing still images of the subject). Specifically, the calibration of cameras is performed to uniformly distance the cameras with respect to the subject such that the surface for the mesh of graphical elements is configured to have an arcuate shape around the subject. In this way, the person using the system and method can have the impression of freely floating around the person observed, i.e. the size of the person observed remains essentially constant irrespective of the angle of viewing.

In an example, the calibration of the plurality of cameras is done by adjusting a zoom level of the cameras. Specifically, the cameras which need to be distantly located from the subject to follow the arcuate shape around the subject, a zoom level of such cameras are increased to compensate the increased distance. This enables in virtually maintaining the uniform distance between the cameras and the subject, independently of the actual distance between the camera and the subject. Similarly, the cameras which need to be closely located to follow the arcuate shape around the subject, a zoom level of such cameras are decreased to compensate the decreased distance.

In an example, if the cameras are mounted on a rectangular frame around the subject, and an arcuate camera positions is expected around the subject. In such instance, by adjusting the zoom level of the cameras the arcuate camera positions around the subject can be achieved. This will allow in presenting an arcuate surface, having graphical elements corresponding to virtual camera positions, on the display of the user device. Alternatively, if the cameras are mounted or attached on an arcuate frame around the subject, and a rectangular camera positions is expected around the subject. This can be also achieved by adjusting the zoom level of the cameras arranged on the arcuate frame to have virtual rectangular camera positions. Therefore, the surface representing positions of the cameras in the co-ordinate system may include a shape which includes but not limited to a dome, a sphere, a hemisphere, a cylinder, an oval, a circular, a polygonal and a combination thereof.

Further, each of the plurality cameras includes individual camera identification (ID). Therefore, each graphical element (corresponding to a specific direction and distance) of the mesh of graphical elements is associated with a camera IDs. Accordingly, the mesh of graphical elements corresponds to position information, IDs and zoom levels of the cameras.

As mentioned above, the user device is operable to render the mesh of graphical elements on top of an active video at the display of the user device. Specifically, the active video corresponds to one of a video from the set of videos originating the plurality of cameras respectively. Further, the active video corresponds to a graphical element (associated with a camera) which is in a middle portion of the display.

For example, in operation, when a user device (based on the system of the present disclosure) is playing a video (i.e. an active video) and the user touches a display, the mesh of graphical elements is present on the display on top of the active video. Specifically, the mesh of graphical elements is transparent and appears on top of the active video, and the active video corresponds to a graphical element present at the middle portion of the display.

In an embodiment, the surface (presented by the user interface on the display) is used as a tool to navigate from one camera view to another camera view. As mentioned above, the surface is basically a 3-dimensional model of the actual (or intended) positions of the cameras (based on the calibration). Therefore, the user touches and moves the surface for shifting the graphical elements from the middle portion of the display and accordingly the camera views for the active video. Specifically, by dragging the finger on the display results in an action such as rotation of the surface (the mesh of graphical elements). Dragging the finger on the display may also results in another action, for example moving the camera angle.

Therefore, the active video from a first video (having first camera view) is altered to a second video (having second camera view), when the user moves the rendered mesh of graphical elements in a way that a first graphical element associated with a first camera providing the first video is shifted from the middle portion and replaced with a second graphical element associated with a second camera providing the second video. Further, the active video is played continuously without any pause during alteration from the first camera view to the second camera view. Naturally, the active video can also be put on pause during the change of the camera view. Moreover, the videos (from which the active video is selected) also recorded or played in synchronization during altering from the first camera view to the second camera view.

In an embodiment, the middle portion of the display of the user device can be determined by dividing the display into plurality of small segments. Specifically, the display can be divided into a matrix, such as a 3×3 matrix or a 5×7 matrix. For example, if the display is of square shape, the display may be divided into a 3×3 matrix (9 segments) or a 5×5 matrix (25 segments), for determining the middle portion of the display. Otherwise, when the display is of rectangular shape, the display can be divided into a 3×5 matrix (15 segments) or a 5×7 matrix (35 segments). It may be evident to those skilled in the art that for determining the middle portion of the display using matrix technique; rows and column are uneven, such as 3, 5, 7 and the like.

Alternatively, the middle portion of the display can be determined by dividing number of pixels in vertical dimension with two or dividing by number of pixels in horizontal dimension by two.

In another embodiment, the active video may correspond to a graphical element, which is in not in the middle portion of the display. For example, the active video may correspond to a graphical element present at a corner of the display. Additionally, the active video may correspond to any graphical element arbitrarily selected by the user from the display.

In an example, the user uses finger for shifting or changing the graphical elements from the middle portion of the display, i.e. navigating from one camera view to another camera view. Otherwise, the user may use tool such as a stylus, a pointing device, tilting action (an accelerometer) of a user device, or even without touching (for example with eye movement) to navigate from one camera view to another camera view. In the following, "finger" is used for sake of conciseness.

In an embodiment, the user interface at the display of the user device further enables in controlling the active video. Specifically, the user interface includes a plurality of user interface elements for controlling the active video. For example, the user interface includes tabs for pause, slow motion, fast motion, fast forwarded, backwards and to play in a loop. Also, the user interface can include a time line for changing a relative position on the active video. The user interface may also include other features, known to a person skilled in the art.

In an embodiment, the active video relates to one of a live video content or a recorded video content. Specifically, the system may be used for managing live video content (i.e. as recording is taking place) or playing the recorded video content. Further, the access can be arranged as streaming service per recorded content of each camera or the recorded video content from each of the cameras can be downloaded to user device for offline usage.

In another embodiment, the system may not include a physical computer server; instead a processor of the user device may be operable to act as the server for managing a video of a camera setup having a plurality of cameras, or the processing can be carried out in a cloud, as explained above in connection with the definition of the term server.

In another aspect, an embodiment of the present disclosure provides a method for managing a set of videos originating from a camera setup having a plurality of cameras, the method comprising:
 rendering a mesh of graphical elements on a display of a user device, the graphical elements being arranged on a virtual surface representing positions of the cameras in a co-ordinate system, and
 playing an active video originating from at least one camera of the camera setup on the display,
wherein the mesh of graphical elements and the active video are superposed on the display, and the active video originates from the at least one camera, which at least one camera is associated with the graphical element located in the middle portion of the display.

In an embodiment, the method further comprises altering the active video from a first video to a second video when a user moves the rendered mesh of graphical elements in a way that a first graphical element representing the position of a first camera configured to provide the first video is shifted from the middle portion and replaced with a second graphical element representing the position of a second camera configured to provide the second video. It is also possible to use another camera as the provider of the active video, than the one represented in the middle portion.

In an example, the active video includes one of a live video content or a recorded video content.

In an example, the virtual surface representing positions of the cameras in the co-ordinate system has a shape which includes but not limited to a dome, a sphere, a hemisphere, a cylinder, an oval, a circular, a polygonal and a combination thereof.

In an embodiment, the automatic presentation of mesh of such graphical elements on the user device is possible when the relative positions of the plurality of cameras with respect to each other are known. For example, the relative positions may be determined based on a calibration method, which is described herein.

As mentioned above, an embodiment of the present disclosure provides the method for determining the relative positions of the plurality of cameras with respect to each other within the location.

The step of measuring the orientation of the at least first, second and third camera of the plurality of cameras is performed by the set of sensors. Specifically, the set of sensors is configured to provide orientation information of the at least first, second and third camera of the plurality of cameras to the server. In an embodiment, the orientation information comprises data about position of the at least first, second and third camera of the plurality of cameras with respect to a reference plane. Further, the orientation information comprises angles at which the plurality of cameras is arranged with respect to X axis of a coordinate system. For example, the orientation information includes values of angle alpha ($\alpha$) (formed with respect to X axis), and angle beta ($\beta$) (formed between a surface defined by X and Y axis).

In another embodiment, the orientation information can be measured based on visual analysis. In yet another embodiment, the location means (such as, GPS sensor) installed in the at least first, second and third camera of the plurality of cameras may detect location of the at least first, second and third camera of the plurality of cameras.

In an instance, the magnetometer behaves as magnetic compass and is operable to find an orientation (or a likely/approximate position) of each of the plurality of cameras, with respect to magnetic field of the location. In another instance, the gyroscope is operable to find an orientation of each of the plurality of cameras based on earth's gravity and the accelerometer is operable to measure non-gravitational acceleration.

Thereafter, a direction of view of the at least first, second and third camera of the plurality of cameras is determined using the measured orientation. Specifically, the server, which is communicably coupled to the plurality of cameras, is configured to receive the orientation information from the set of sensors (installed in the plurality of cameras) and determine the direction of view of the at least first, second and third camera of the plurality of cameras thereafter.

Alternatively, the direction of view of the at least first, second and third of the plurality of cameras is determined using the measured orientation and/or information associated with a defined geometrical shape of the location where the plurality of cameras is arranged. In such instance, the database of the server has pre-stored information associated with the geometrical shape of the location. In an example, dimensions of the location (such as, a badminton court of cuboidal shape, having a length of 200 meters, a width of 100 meters and a height 150 meters) may be stored therein. Similarly, dimensions of the location (such as, a track field of a sphere or a quasi-sphere shape having a radius of 100 meters) may also be stored therein.

The first iteration of the relative positions of the at least first, second and third camera of the plurality of cameras is made thereafter based on the determined direction of view. Specifically, the server uses the determined direction as a first approximation to find the relative positions of the at least first, second and third camera of the plurality of cameras, i.e. to determine a likely position of the plurality of cameras assuming that these are equidistant from the subject. Further, the first iteration is based on assuming the orientation of the at least first, second and third camera of the plurality of cameras is towards the subject.

In an example, the server is operable to make the first iteration of the relative positions of the at least first, second and third camera of the plurality of cameras based on calculating the position by looking on a value in respect to a common co-ordinate base of the plurality of cameras and the orientation information (such as, information measured by magnetometer, using a magnetic compass). Typically, the magnetic compass has a measuring circle where 0 degree corresponds to North, 90 degrees correspond to East, 180 degrees correspond to South and 270 degrees correspond to West. In an example, if the first camera is aiming to direction $\alpha=270$ degrees, based on the assumption that the orientation of the at least first, second and third camera is towards the subject, thus its position around the subject is in $\alpha-180=90$ degrees.

Further, relative distances between the at least first, second and third camera of the plurality of cameras are measured thereafter. Specifically, the relative distances between the pluralities of cameras are measured by the server. In an embodiment, as the first iteration of the relative positions of the at least first, second and third of the plurality of cameras is made based on an assumption that each of the plurality of cameras point towards the subject, and may not always yield correct results. For example, if the cameras are arranged in a way that the second camera and the third camera of the plurality of cameras point in a direction away from the subject, then in such instance, the first iteration of the relative positions of the at least first, second and third camera of the plurality of cameras will not hold good. Also, if the cameras are arranged adjacent to each other (for example, on a rectangular track) and in a way that the second and the third cameras point in a same direction, then in such instance, the second and the third cameras could not be distinguished and only the determined directional information would not provide sufficient information to order these cameras since these point to the same direction. This may be addressed by measuring the relative distances between the at least first, second and third camera of the plurality of cameras.

In an embodiment, the measured relative distances may be based on calculating received signal strength indicator (RSSI) values between the at least first, second and third camera of the plurality of cameras. Specifically, each of the plurality of cameras may be configured to send and receive radio waves using the communication medium, such as Bluetooth (BT) of each of the plurality of cameras. For example, the first camera is configured to send pings over Bluetooth and the second and the third cameras are configured to receive the pings and measure RSSI thereof. Similarly, the second camera is configured to send pings over Bluetooth and the first and the third cameras are configured to receive the pings and measure RSSI thereof. Similarly, the third camera is configured to send pings over Bluetooth and the first and the second cameras are configured to receive the pings and measure RSSI thereof. Additionally or alternatively the relative distance between cameras can be determined with Global Positioning System (GPS). Additionally or alternatively the relative distance between cameras can be determined with voice. In this alternative embodiment one or more of the cameras make a sound and other cameras (the recording cameras) record the sound. The arrival time of the sound to the recording camera is used to determine the relative position of the cameras. The recording cameras may additionally use the moment of sending, i.e. the time of travel of the voice, as well as optionally a triangulation technique with other recording cameras to determine their relative positions. Additionally or alternatively other radio technologies than BT can be used, such as (but not limited to) Wireless Local Area Network, low power BT etc.

The second iteration of the relative positions of the at least first, second and third camera of the plurality of cameras is made thereafter, based on the measured relative distances. The second iteration of the relative positions is based on comparing the measured relative distances to theoretical distance between the at least first, second and third camera of the plurality of cameras. Specifically, the second iteration of the relative positions is based on dividing the measured relative distances and the theoretical distance between the at least first, second and third camera of the plurality of cameras. In an embodiment, the theoretical distance defines a geometrical shape of the location for example, circular, rectangular and the like. Further, the relative positions of the at least first, second and third camera of the plurality of cameras with respect to each other are determined using the first iteration and the second iteration.

In an example, if distances between the relative positions of each of the at least first, second and third camera of the plurality of cameras (after the second iteration) comes out to be substantially same (within error margins), then the orientation information and the relative positions of each of the plurality of cameras is right. Otherwise, a user (such as, an administrator or a user associated with a camera of the plurality of cameras) is instructed to correct position of the at least first, second and third camera of the plurality of cameras.

In an embodiment, the determined relative positions of the at least first, second and third camera of the plurality of cameras is shown in the first and second user devices. In an embodiment, if a user is not satisfied with the positions, then graphical elements can be dragged and dropped to appropriate relative positions using the user interface of the user device. Alternatively, if the user agrees with the positions, then the videos of the subject can be recorded using the plurality of cameras thereafter. Specifically, in such instance, the user sends start recording command substantially simultaneously to each of the plurality of cameras and thereafter receives recorded videos (or in real time receives and stores the streamed videos from the plurality of cameras). Specifically, each of the plurality of cameras comprises an application installed therein which is operable to start recording (and storing or streaming content to target device/server) the video substantially at the same time as other cameras. The server has a file or a set of files for reproducing videos from multiple angles. The recorded videos can further be viewed with the user interface of the first and second user devices.

In an embodiment, if the user starts a new recording session and wants to position the plurality of cameras the way the cameras were positioned earlier. In such instance, the user loads the earlier used camera configuration for reference and the user interface indicates the current camera positions. The user can now physically move the cameras to correct positions to match with the earlier used configuration. In an embodiment, the user interface may have indicators configured to show when each camera position matches with the earlier used position.

The present disclosure provides a method and a system for determining relative positions of a plurality of cameras with respect to each other within a location. Further, the method and system enable determination of an order in which the plurality of cameras is arranged around the subject. Moreover, the method and system enable easy alignment and positioning of the plurality of cameras for providing multiple viewing positions on the user interface. For example, the method and system of the present disclosure enable in correlating the recording direction, the relative positions and the order in which the cameras are arranged to provide multiple viewing positions. Further, the method and system is less prone to errors, as the method and system eliminate the need to manually set the plurality of cameras around the subject. The plurality of cameras can be arranged in an arbitrary manner in a three dimensional space and can point to arbitrary directions.

Further, the present disclosure provides a system and a method for managing a set of videos originating from a camera setup having a plurality of cameras. More specifically, the system and method of the present disclosure provides an exciting viewing experience to a user by providing a video with multiple camera views (based on the plurality of cameras). The system and method further enables in easily navigating from one camera view to another while watching the video. Moreover, the system and method enables in considering arbitrary or non-uniform positions (distances and directions) of the cameras while streaming the video at the user device.

DETAILED DESCRIPTION OF THE DRAWINGS

Referring now to the drawings, particularly by their reference numbers FIG. 1 is a schematic illustration of a system 100 for managing a video of a camera setup having a plurality of cameras, in accordance with an embodiment of the present disclosure. As shown, the system 100 includes a camera setup 102 having a plurality of cameras, such as cameras 104a, 104b, 104c (hereinafter collectively referred to the plurality of cameras 104). In this embodiment, the camera setup 102 also includes a frame 106 for supporting the plurality of cameras 104 around the subject 110, which is shown as a basketball player. Therefore, it may be evident to those skilled in the art that the camera setup 102 relates to a basketball court for managing (recoding and/or playing) a video of a basketball match.

The system 100 further includes a server 120 and a user device 130. The server 120 is communicably coupled to the plurality of cameras 104 and the user device 130 by a communication network 140. The plurality of cameras 104 is configured to capture or film videos of the subject 110 simultaneously from different positions (i.e. different directions and distances). Further, the captured videos are fed or forwarded to the server 120 by the communication network 140 for processing. Moreover, the videos can be accessed (played and/or stored) by the user device 130 from the server 120 using the communication network 140 on user's request.

Figure 2:
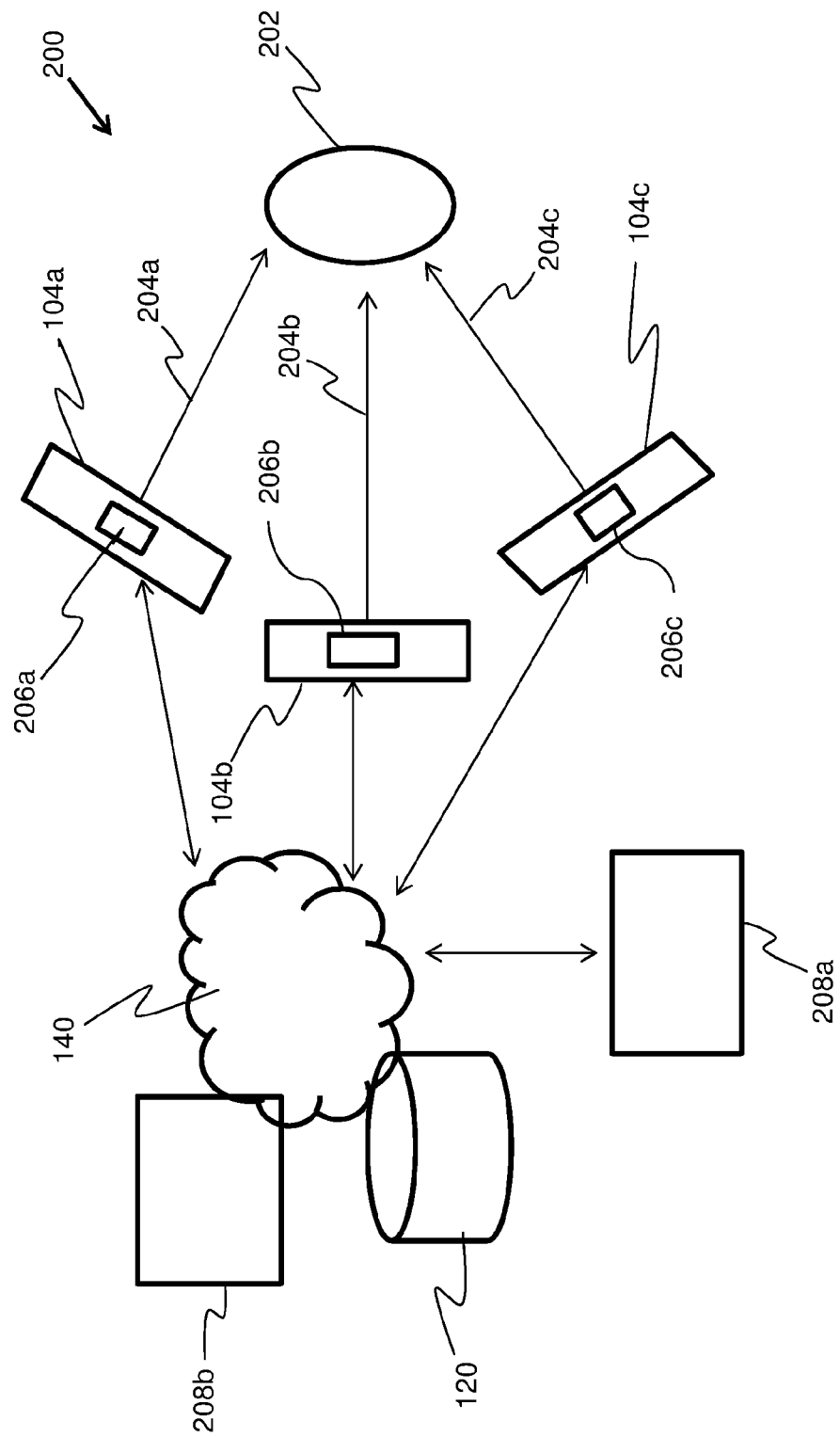
FIG. 2 is a schematic illustration of an environment for suitably practicing various embodiments of the present disclosure.

Referring to FIG. 2, illustrated is a schematic illustration of a system 200 for suitably practicing various embodiments of the present disclosure. As shown, the plurality of cameras 104 are arranged in such a way that the plurality of cameras 104 hemi-spherically surrounds a subject 202 for recording videos of the subject 202. Specifically, the cameras 104a, 104b and 104c point to directions 204a, 204b and 204c (hereinafter collectively referred to as directions 204) respectively for recording the videos of the subject 202. Specifically, each of the plurality of cameras 104 is associated with a respective direction. As a result, each camera of the plurality of cameras 104 has a particular direction of view, which enables each of the plurality of cameras 104 to record videos of the subject 202 from a certain required angle and direction. The directions 204 are determined based on orientation information of the cameras 104a, 104b and 104c, measured by orientation sensors (206a, 206b and 206c) respectively.

Each of the plurality of cameras 104 is communicably coupled to a plurality of user devices, such as user devices 208a and 208b (hereinafter collectively referred to as plurality of user devices 208) via the communication network 140. Specifically, each of the plurality of cameras 104 hosts an application, which is configured to connect each of the plurality of cameras 104 to each of the plurality of user devices 208 via the communication network 140. The videos of the subject 202 recorded by each of the plurality of cameras 104 may be stored in a database (not shown), which is communicably coupled to the server 120 along with other related metadata of each of the plurality of cameras 104.

The server 120 is operable to process the received videos from the plurality of cameras 104 and further configured to send the processed videos to the plurality of user devices 208. The plurality of user devices 208 is configured to remotely control the plurality of cameras 104. It is also possible that only one user device is configured to remotely control the cameras, whereas the other user devices are receiving information without having the ability to control the cameras. Specifically, a user interface (not shown) of each of the plurality of user devices 208 is configured to remotely control the plurality of cameras 104, for example by sending commands to start/stop recording or streaming image/video of the subject 202. The user interface of each of the plurality of user devices 208 is configured to enable a user to change direction of view of the plurality of cameras 104 depending upon the video received from the plurality of cameras 104. The direction of view (or recording directions i.e. corresponding viewing positions) of the plurality of cameras 104 can be changed based on determined directions (described in subsequent figures).

Figure 3:
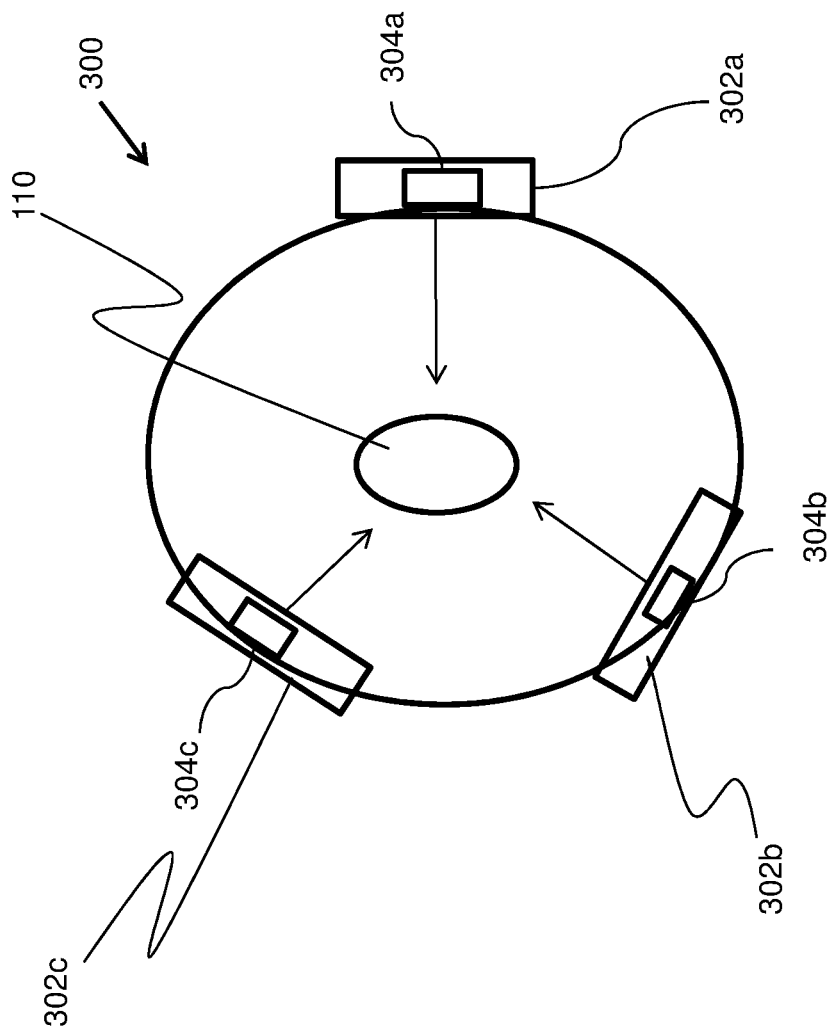
FIGS. 3-4 are example illustrations depicting orientation arrangements of a plurality of cameras around a subject, in accordance with an embodiment of the present disclosure.
Figure 3:
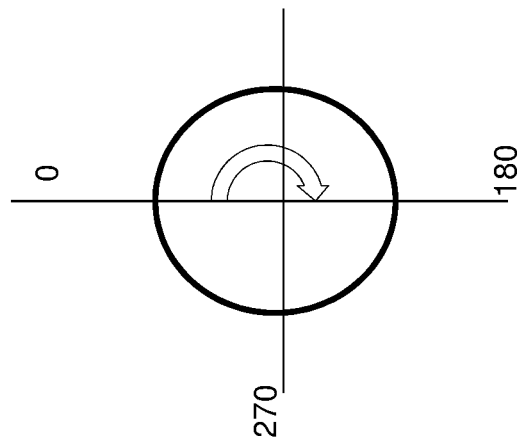
Figure 4:
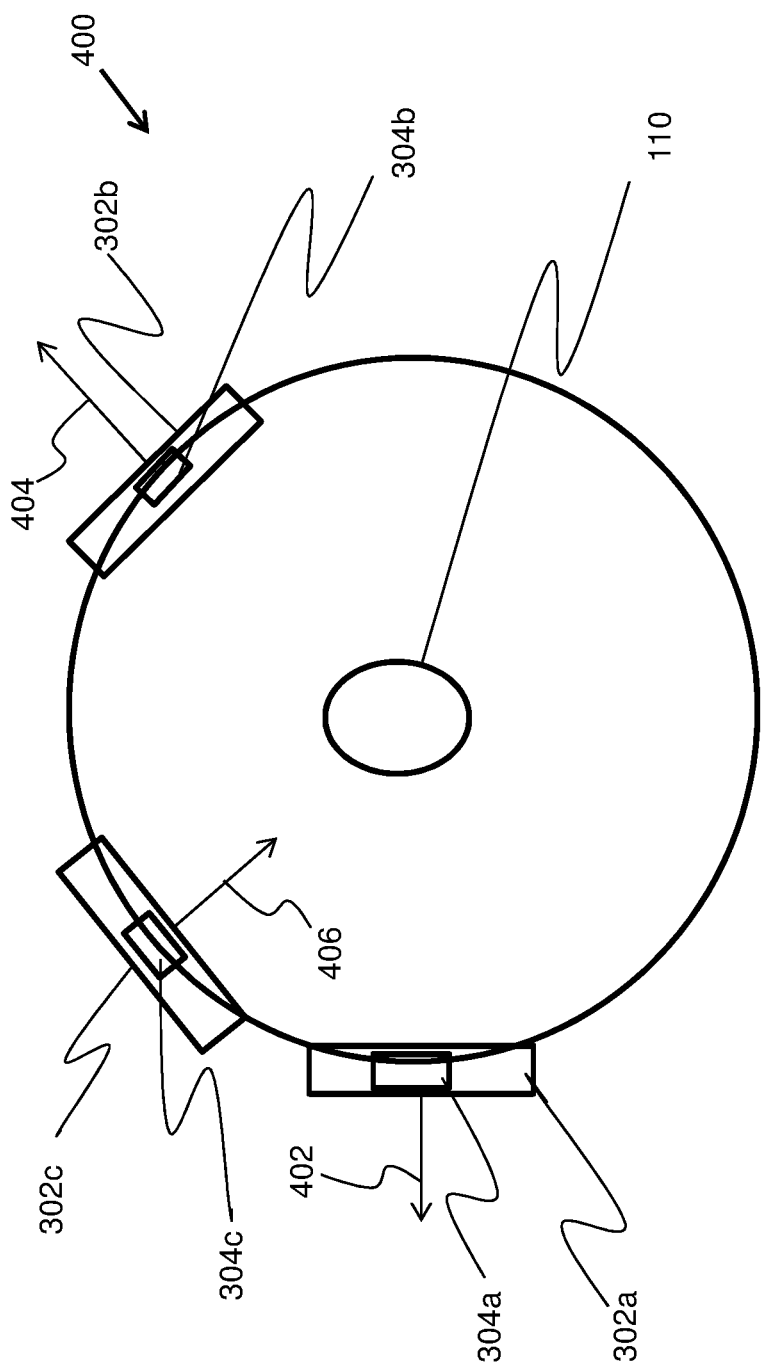

Referring to FIGS. 3-4, illustrated are example illustrations depicting orientation arrangements, such as orientation arrangements 300 and 400, respectively, of the plurality of cameras 302 around the subject 110, in accordance with an embodiment of the present disclosure.

As shown in FIG. 3, cameras 302a, 302b and 302c are arranged around the subject 110 in a circular fashion forming the orientation arrangement 300. Specifically, the orientation arrangement 300 includes the cameras 302a, 302b and 302c arranged in a clockwise manner. Further, the cameras 302a, 302b and 302c have orientation sensors 304a, 304b and 304c respectively, installed therein.

The orientation sensors 304a, 304b and 304c are configured to measure orientation data of the cameras 302a, 302b and 302c respectively and further configured to send the measured orientation data to the server 120 (shown in FIG. 1). Specifically, the server 120 is configured to process the orientation data of the cameras 302a, 302b and 302c and further configured to determine a direction of view of the cameras 302a, 302b and 302c using the measured orientation, described in detail in FIGS. 7 and 8. The server 120 is further operable to make a first iteration of the relative positions of the cameras 302a, 302b and 302c based on the determined direction, assuming that the cameras 302a, 302b and 302c are placed at equal distance from the subject 110.

Specifically, the server 120 is configured to determine the likely positions of the cameras 302a, 302b and 302c by considering value in respect to a common co-ordinate base of the cameras 302a, 302b and 302c. For example, the camera 302a has a direction, α=370 degrees, thus its position around the subject 110 is estimated to be α−180=90 degrees. Further, this estimation determines a relative position of the cameras 302a, 302b and 302c.

As shown in FIG. 4, the cameras 302a, 302b and 302c are arranged in a way that the direction of views are determined by the sensors 304a, 304b and 304c, and shown as directions 403, 404 and 406 respectively. In such instance, the server 120 is configured to measure relative distances between the cameras 302a, 302b and 302c and further configured to make a second iteration of the relative positions of the cameras 302a, 302b and 302c based on the measured relative distances, which is described in detail in FIG. 5.

Figure 5:
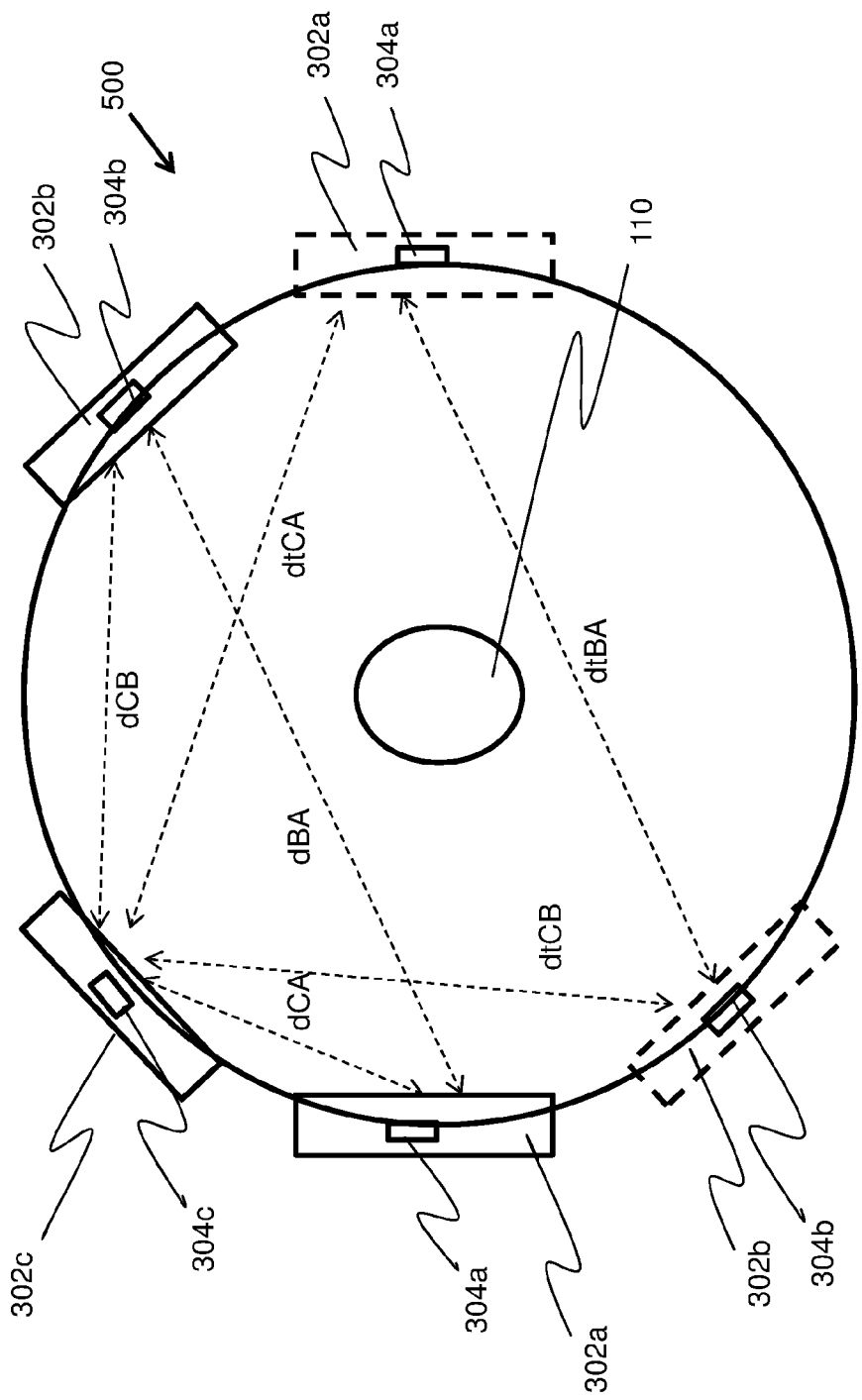
FIG. 5 is an example illustration for determining relative positions of the plurality of cameras having the orientation arrangements of FIGS. 3-4, in accordance with an embodiment of the present disclosure.

Referring now to FIG. 5, illustrated is an example illustration of an arrangement 500 depicting positions of the cameras 302a, 302b and 302c illustrated in the orientation arrangements 300 and 400, in accordance with an embodiment of the present disclosure. FIG. 5 illustrates measurement of relative distances between the cameras 302a, 302b and 302c with respect to each other. Specifically, the relative distances are measured based on calculating received signal strength indicator values between the cameras 302a, 302b and 302c. As shown, the relative distances between the cameras 302a, 302b and 302c are dAB, dAC and dBC.

Further, the second iteration of the relative positions of the cameras 302a, 302b and 302c is made based on the measured relative distances. Specifically, the second iteration of the relative positions is based on comparing the measured relative distances and a theoretical distance between the cameras 302a, 302b and 302c. As shown, the theoretical distance between the cameras 302a, 302b and 302c are dtAB, dtAC and dtBC. More specifically, the second iteration of the relative positions is based on dividing the measured relative distances and the theoretical distance between the cameras 302a, 302b and 302c, illustrated below as:

$$rAB=dAB/dtAB,$$

$$rAC=dAC/dtAC,$$

$$rBC=dBC/dtBC.$$

The values rAB, rAC and rBC are the relative positions of the cameras with respect to each other. If distances between the relative positions of the cameras 302a, 302b and 302c (after the second iteration) come out to be substantially same, then the orientation information and the relative positions of the cameras 302a, 302b and 302c are right. Otherwise, a user (such as, an administrator or a user associated with a camera of the cameras 302a, 302b and 302c) may be instructed to correct position of the cameras 302a, 302b and 302c.

Figure 6:
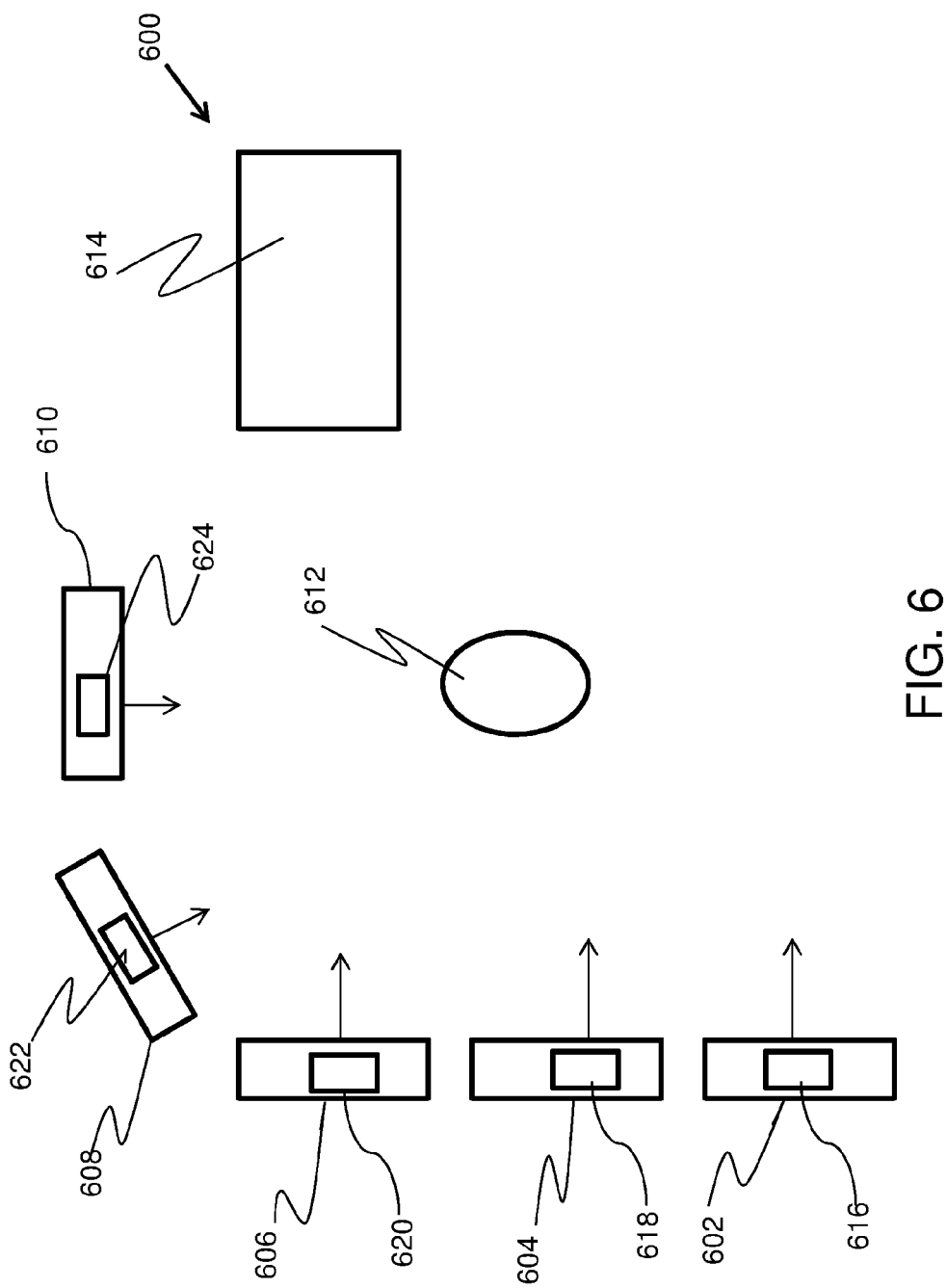
FIG. 6 is an example illustration for determining relative positions of a plurality of cameras and order thereof, in accordance with an embodiment of the present disclosure.

Referring now to FIG. 6, illustrated is an example illustration 600 for determining relative positions of a plurality of cameras, such as cameras 602, 604, 606, 608 and 610 with respect to each other, in accordance with an embodiment of the present disclosure. As shown, the cameras 602, 604, 606, 608 and 610 are arranged around a subject 612 (unlike circular manner, as shown in FIG. 5). Each of the cameras 602, 604, 606, 608 and 610 is communicably coupled to a user device 614 via the communication network 140 (as shown in FIG. 1). Specifically, each of the cameras 602, 604, 606, 608 and 610 hosts an application, which is configured to connect each of the cameras 602, 604, 606, 608 and 610 to the user device 614 via the communication network 140 (shown in FIG. 1).

Further, each of the cameras 602, 604, 606, 608 and 610 has orientation sensors 616, 618, 620, 622 and 624, respectively, installed therein. Each of the orientation sensors 616, 618, 620, 622 and 624 are configured to measure an orientation data of the cameras 602, 604, 606, 608 and 610, respectively, and further configured to communicate the measured orientation data to the user device 614. The server 120 (as shown in FIG. 1) or the user device 614 is configured to use the orientation data to determine direction of view of each of the cameras 602, 604, 606, 608 and 610 from where the cameras 602, 604, 606, 608 and 610 are recording videos of the subject 612. As shown, based on the determined direction of views, it is clear that the cameras 602, 604 and 606 point in a same direction and can distinguish between the cameras 602, 604 and 606, and the cameras 608 and 610.

Further, the server 120 (as shown in FIG. 1) or the user device 614 is configured to determine the relative positions of the cameras 602, 604, 606, 608 and 610 with respect to each other based on calculating the received signal strength indicator values between each of the cameras 602, 604, 606, 608 and 610 (and optionally between the cameras 602, 604, 606, 608 and 610 and the user device 614). In an instance, the relative distance between the cameras 602 and 610 is greater than the relative distance between the cameras 604 and 610, which is further greater than the relative distance between the cameras 606 and 610. This enables the server 120 (as shown in FIG. 1) or the user device 614 to determine an order in which the cameras 602, 604, 606, 608 and 610 are arranged.

Moreover, the user device 614 is configured to display the determined relative positions of the cameras 602, 604, 606, 608 and 610 with respect to each other to a user. A user interface (not shown) of the user device 614 comprises a mesh of graphical elements, corresponding to each of the cameras 602, 604, 606, 608 and 610, which allows the user to change the relative positions of the cameras 602, 604, 606, 608 and 610 (if needed) by dragging and dropping the graphical elements to appropriate/desired relative positions.

The user device 614 is further configured to send commands for starting recording/streaming of the subject 612 by the cameras 602, 604, 606, 608 and 610 and further configured to receive the recorded content, such as audios/videos and store thereafter in a database (not shown) communicably coupled thereto or with the server 120 (of FIG. 1). Furthermore, the user device 614 is configured to display, via the user interface, the recorded video to the user.

Figure 7:
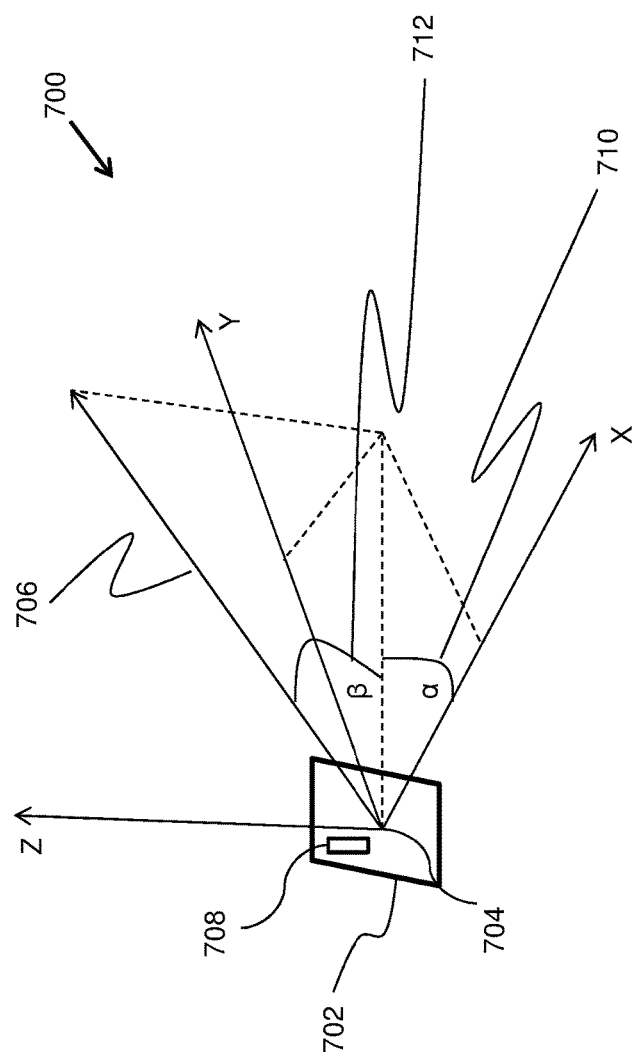
FIG. 7 is a schematic illustration of a camera and its orientation information with respect to a co-ordinate system, in accordance with an embodiment of the present disclosure.

Referring to FIG. 7, illustrated is a schematic illustration of a co-ordinate system 700 (designated with X, Y Z axes) used for practicing various embodiments of the present disclosure. As shown, the coordinate system 700 includes a camera 702 placed at a location 704, which is represented by coordinates: (x0, y0, z0). Further, a direction of view of the camera 702 is indicated with an arrow 706. The direction of view of the camera 702 is estimated from orientation information of the camera 702, measured by an orientation sensor 708 installed therein. Specifically, the direction of view is represented in angle alpha ($\alpha$) 710 from the X axis and in angle beta ($\beta$) 712 from surface defined by the X and Y axes.

Figure 8:
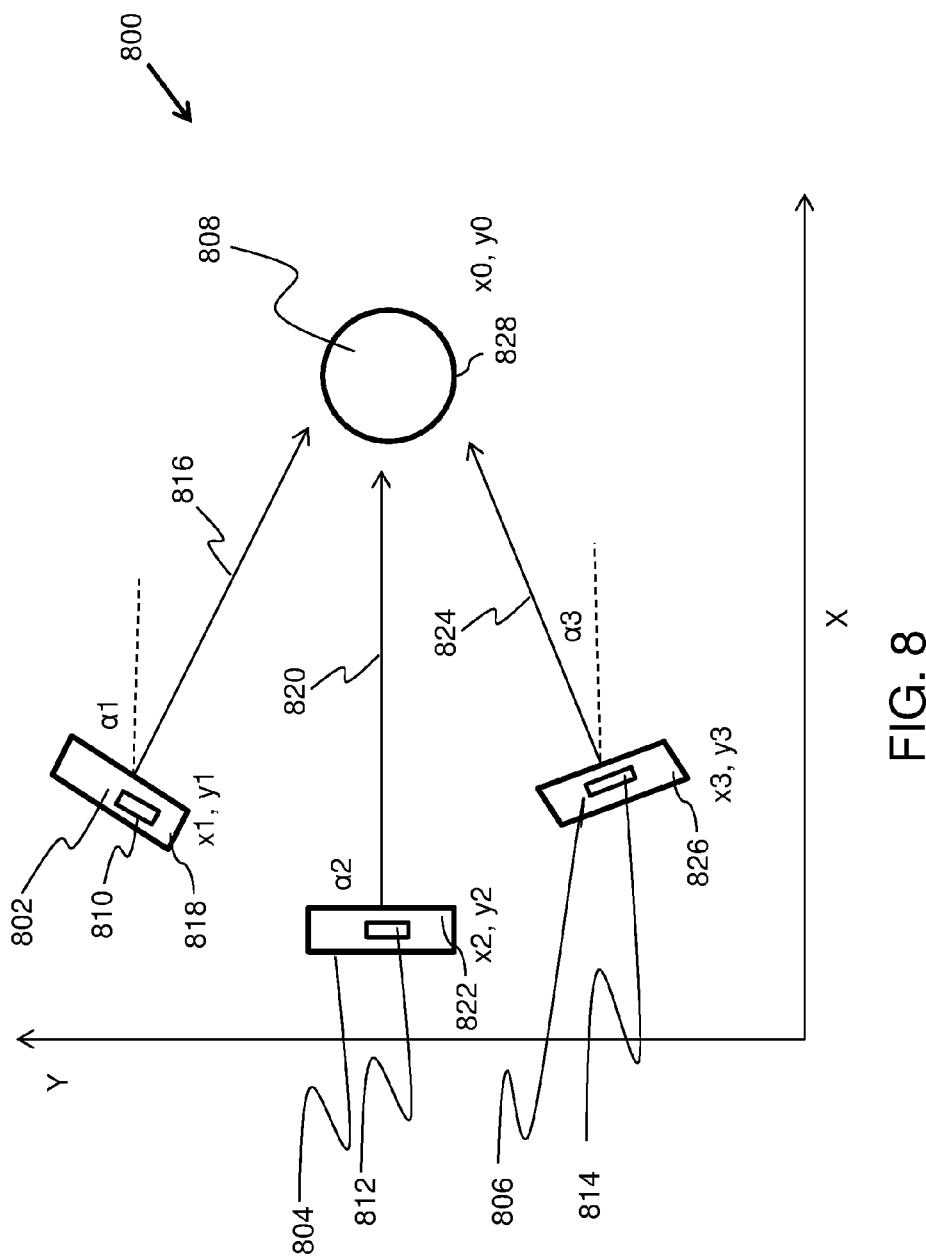
FIG. 8 is schematic illustration of a plurality of cameras and its orientation information with respect to another coordinate system, in accordance with an embodiment of the present disclosure.

Referring now to FIG. 8, illustrated is an example illustration depicting a plurality of cameras in a coordinate system 800, in accordance with an embodiment of the present disclosure. As shown, the coordinate system 800 includes the cameras 802, 804 and 806, each having angle (beta $\beta$=0, as shown in FIG. 7) as seen from a direction of Z-axis (not shown). Also, shown is a subject 808 to be recorded by the 802, 804 and 806. Specifically, FIG. 8 illustrates orientation information of the cameras 802, 804 and 806, determined by orientation sensors 810, 812 and 814 installed therein respectively.

The orientation information includes angles at which the cameras 802, 804 and 806 are arranged with respect to X axis, which is used to determine a direction of view of each of the cameras 802, 804 and 806 and their relative position thereafter. In an instance, the orientation sensor 810 installed in the camera 802 determines that the camera 802 is in angle $\alpha 1$ with respect to X-axis. This data may be used by the user device 614 (shown in FIG. 6) or by the server 120 (shown in FIG. 1) to determine a direction of view of the camera 802, which is indicated with an arrow 816, and a position of the camera 802, indicated at a location 818 represented by coordinates (x1, y1).

Further, the orientation sensor 812 installed in the camera 804 determines that the camera 804 is in angle α2 with respect to X-axis. This data may be used by the user device 614 (of FIG. 6) or by the server 120 (of FIG. 1) to determine a direction of view of the camera 804, which is indicated with an arrow 820 and a position of the camera 804, indicated at a location 822 represented by coordinates (x2, y2). The orientation sensor 814 installed in the camera 806 determines that the camera 806 is in angle α3 with respect to X-axis. Similarly, this data may be used by the user device 614 (of FIG. 6) or by the server 120 (of FIG. 1) to determine a viewing direction of the camera 806, which is indicated with an arrow 824 and a position of the camera 806, indicated at a location 826 represented by coordinates (x3, y3). Further, the subject 808 is placed at a location 828 represented by coordinates (x0, y0). Embodiment of the disclosure is not limited to two dimensional case i.e. cameras 804, 806, 808 can be in a same level in respect to a XY plane (z1=z2=z3) or the cameras can be in different planes in respect to a XY plane (z1< >z2, z2< >z3 for example).

Figure 9:
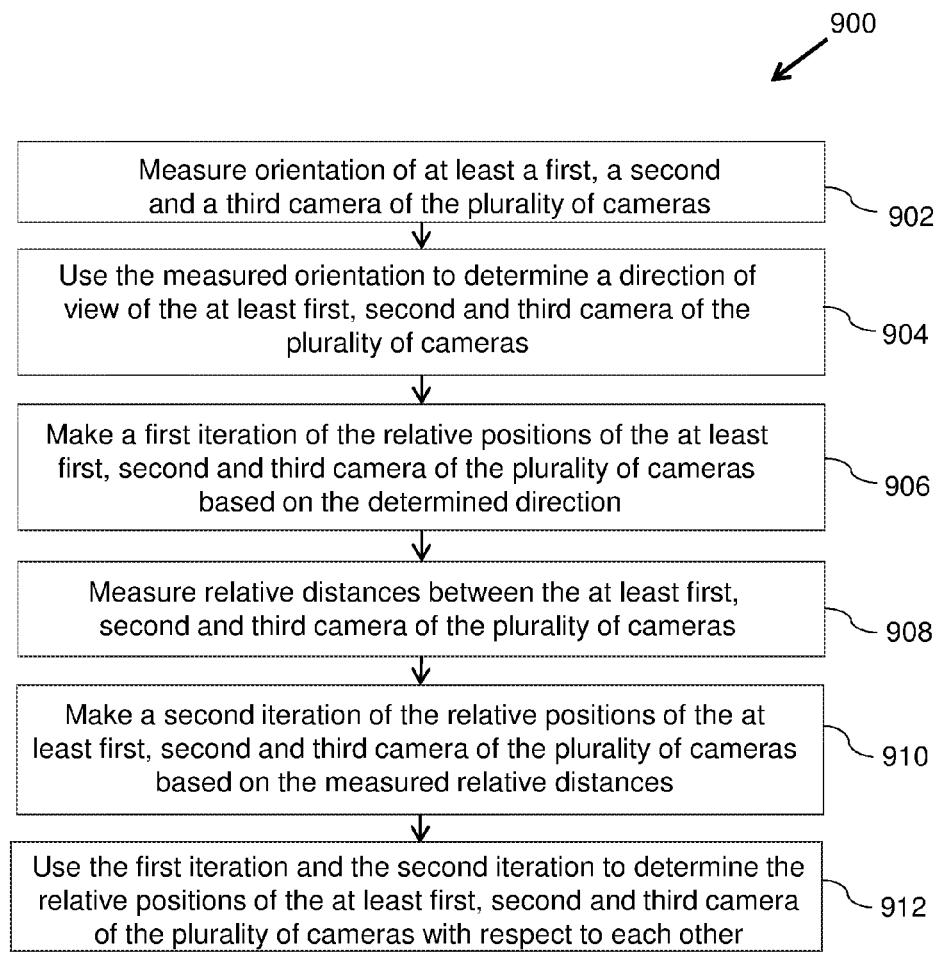
FIG. 9 is an illustration of steps of a method for determining relative positions of the plurality of cameras with respect to each other within a location.

Referring now to FIG. 9, illustrated are steps of a method 900 for determining relative positions of a plurality of cameras with respect to each other within a location, in accordance with an embodiment of the present disclosure. Specifically, those skilled in the art would recognize that the method 900 illustrates steps involved in the operation of the system 100, explained in conjunction with the FIG. 1.

At step 902, orientation of at least a first, a second and a third camera of the plurality of cameras are measured. At step 904, a direction of view of the at least first, second and third camera of the plurality of cameras is determined using the measured orientation. At step 906, a first iteration of the relative positions of the at least first, second and third camera of the plurality of cameras is made based on the determined direction.

At step 908, relative distances between the at least first, second and third camera of the plurality of cameras are measured. At step 910, a second iteration of the relative positions of the at least first, second and third camera of the plurality of cameras is made based on the measured relative distances. At step 912, the relative positions of the at least first, second and third camera of the plurality of cameras with respect to each other are determined using the first iteration and the second iteration.

The steps 902 to 912 are only illustrative and other alternatives can also be provided where one or more steps are added, one or more steps are removed, or one or more steps are provided in a different sequence without departing from the scope of the claims herein. For example, in the method 900, the first iteration is based on assuming the orientation of the at least first, second and third camera of the plurality of cameras is towards an subject. Further, in the method 900, the measured relative distances are based on calculating received signal strength indicator values between the at least first, second and third camera of the plurality of cameras. Furthermore, in the method 900, the second iteration of the relative positions is based on comparing the measured relative distances and a theoretical distance between the at least first, second and third camera of the plurality of cameras. Moreover, in the method 900, the theoretical distance is based on assuming the location to be of a defined geometric shape.

Figure 10:
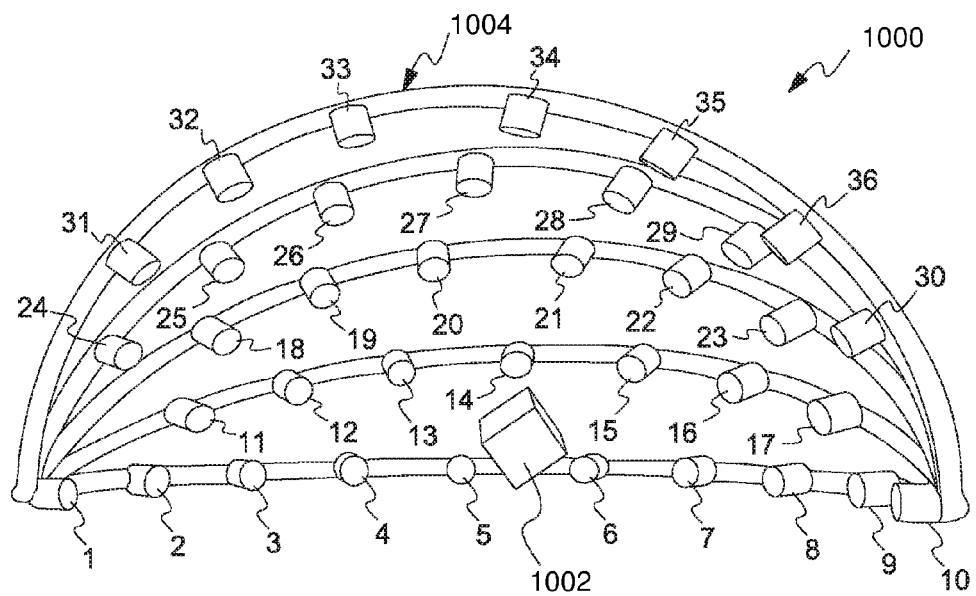
FIG. 10 is a schematic illustration of an example camera setup with respect to an example subject, in accordance with an embodiment of the present disclosure.

Referring now to FIG. 10, shown is a schematic illustration of an example camera setup 1000 (such as the camera setup 102) with respect to an example subject 1002 (such as the subject 110), in accordance with an embodiment of the present disclosure. The camera setup 1000 includes cameras 1-36, in which each camera includes a camera identification (ID), such as CA1-CA36. The camera setup 1000 also includes a frame 1004. As shown, the frame 1004 in configured to have an arcuate shape (i.e. to constitute a semi-hemispherical shape) around the subject 1002. Further, the cameras 1-36 are positioned differently (in different directions and distances) with respect to the subject 1002 and to each other.

The different positions of the cameras 1-36 with respect to each other and to the subject 1002 are determined with the help of the server 120 (shown in FIG. 1). The determination of the camera positions is performed by placing the subject 1002 (with known dimension, shape and color) at a place from where the subject 1002 is to be filmed or captured. The cameras 1-36 thereafter take still images or video images of the subject 1002 and forward to the server 120. The images of the subject 1002 are analyzed by the server system 120 (for example by an algorithm) to determine directions and distances (i.e., X, Y, Z co-ordinates and altitude) of the cameras 1-36 with respect to each other and to the subject 1002.

The determined positions of the cameras 1-36 are further processed by the server 120 for defining a mesh of graphical elements (corresponding to the positions of the cameras 1-36) to be presented on a user device (such as the user device 130). Specifically, based on the determined positions, the cameras 1-36 are calibrated to present the mesh of graphical elements in a surface having an arcuate in shape. The calibration of cameras 1-36 are performed to uniformly distant the cameras 1-36 with respect to the subject 1002, such that the surface for the mesh of graphical elements is configured to have an arcuate shape around the subject 1002. As shown in FIG. 10, the frame 1004 in configured to have the arcuate shape, accordingly the surface for the graphical elements (associated with the cameras 1-36) would be arcuate in shape.

Figure 11:
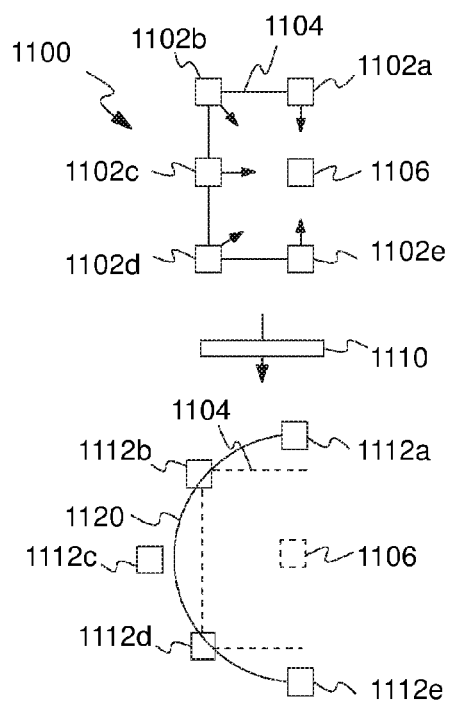
FIG. 11 is a schematic illustration for calibration of an example camera setup, in accordance with an embodiment of the present disclosure.

Referring now to FIG. 11, shown is a schematic illustration for calibration of an example camera setup 1100, in accordance with an embodiment of the present disclosure. Specifically, the FIG. 11 illustrates calibration the camera setup 1100 which is non-arcuate in shape. As shown, the camera setup 1100 includes a plurality of cameras 1102a, 1102b, 1102c, 1102d, and 1102e (collectively referred to cameras 1102) mounted on a wall 1104 (frame for the cameras 1102) that surround a subject 1106. As shown, the plurality of cameras 1102 is positioned in a non-arcuate manner, therefore the cameras 1102 are calibrated for achieving a virtual arcuate shape. Specifically, the images of the subject 1106 are processed by an algorithm 1110 to present an arc 1120 with camera indexes 1112a, 1112b, 1112c, 1112d, and 1112e (collectively referred to as the cameras indexes 1112) corresponding to the cameras 1102. The camera indexes 1112 are achieved by altering camera views, particularly, by adjusting a zoom level of the cameras 1102.

As shown, for FIG. 11 the calibration of the camera setup 1100 is performed in the following manner:

The camera 1102a is designated with the camera index 1112a, i.e. a virtual distance which is increased as compared to an actual distance (since the camera 1102a should lie outside the wall 1104 to follow the arc 1120). Therefore, a zoom level of the camera 1102a is increased from a standard zoom level (i.e. zoom level >1) based on the increased distance.

The camera 1102b is designated with the camera index 1112b, i.e. a virtual distance which is equal to the actual distance (as the camera 1102b lies on the arc 1120). Therefore, a zoom level of camera 1102b is not changed, i.e. maintained at the standard zoom level (i.e. zoom level=1).

The camera 1102c is designated with the camera index 1112c, i.e. a virtual distance increased as compared to an actual distance (for allowing the camera 1102c to follow the arc 1120). Therefore, a zoom level of the camera 1102c is the increased (i.e. zoom level >1).

The camera 1102d is designated with the camera index 1112d, i.e. a virtual distance which is equal to the actual distance (as the camera 1102d lies on the arc 1120). Therefore, a zoom level of the camera 1102d is not changed (i.e. zoom level=1).

The camera 1102e is designated with the camera index 1112e, i.e. a virtual distance increased as compared to an actual distance (for allowing the camera 1102e to follow the arc 1120). Therefore, a zoom level of the camera 1102e increased (i.e. zoom level >1).

Further, the virtual positions of the cameras 1102 (based on the calibration of the cameras 1102) with respect to each other and to the subject 1106 are determined. The determined virtual positions of the cameras 1102, associated with the arc 1120 and the camera indexes 1112, form part of a surface for a mesh of graphical elements to be rendered at a display of a user device for providing different camera views for an active video based on user selection.

Figure 12A:
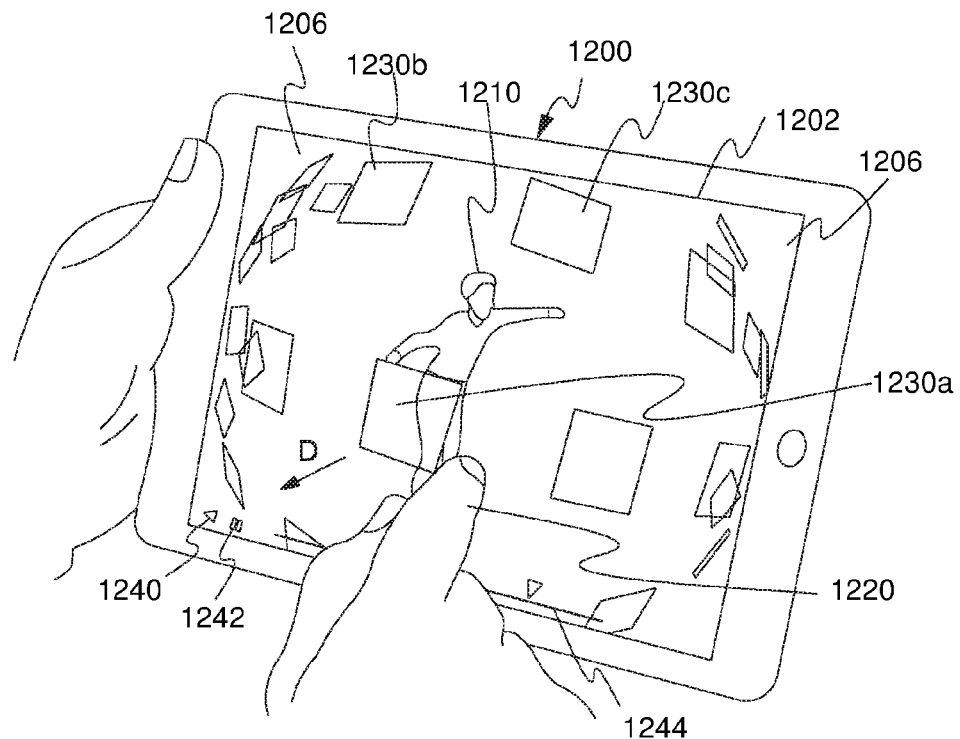
FIGS. 12A & 12B are schematic illustrations of user interfaces rendered at a display of a user device, in accordance with various embodiments of the present disclosure.
Figure 12B:
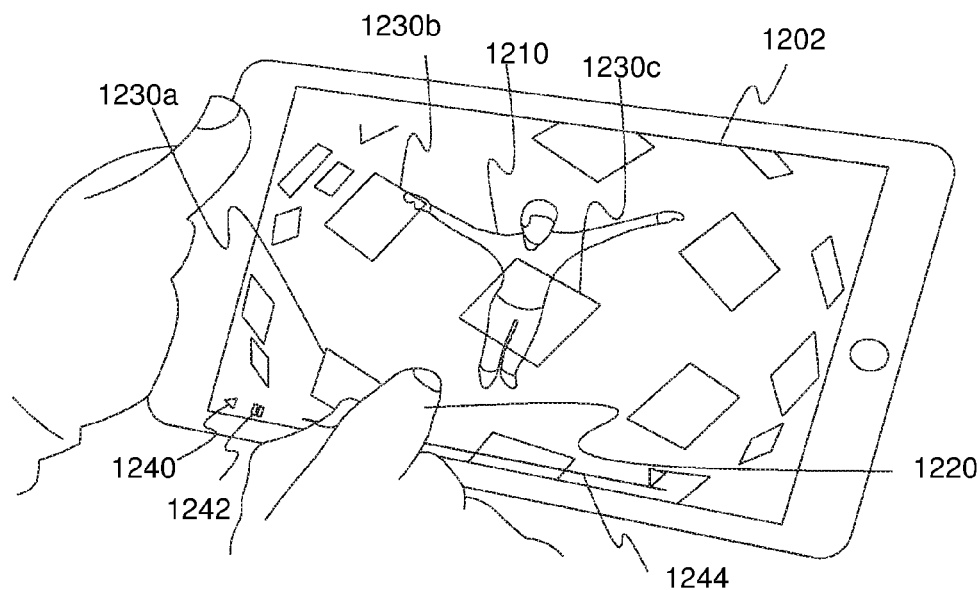

Referring now to FIGS. 12A & 12B, illustrated are of various user interfaces rendered at a display of a user device, in accordance with various embodiments of the present disclosure.

FIG. 12 illustrates a user device 1200 (such as a tablet) having a display 1202 rendered with a user interface 1206. Also, a video of a subject 1210 (for example a person) is rendered at the display 1202 of the user device 1200. As shown, a finger 1220 of the user is in contact with the display 1202, and thus the user interface 1206 presents a mesh of graphical elements, such as graphical elements 1230a, 1230b and 1230c (collectively referred to as graphical elements 1230), at the display 1202 on top of the video of the subject 1210. The graphical elements 1230 are associated with camera IDs. For example, the graphical element 1230a is associated with camera, such as a camera 20 of FIG. 10 having a camera ID CA20. Similarly, the graphical elements 1230b and 1230c are associated with the cameras 26 and 27 of FIG. 10 having camera IDs CA26 and CA27.

Further, the graphical elements 1230 are arranged on a surface defined by positions (X, Y, Z co-ordinates and altitudes) of the cameras, such as the cameras 20, 26 and 27. As shown, the surface on which the graphical elements 1230 are arranged is semi-hemispherical in shape (for example with a radius of 5 meters i.e. cameras are at about 5 meters distance from a subject). Further, the graphical element 1230a of the user interface 1206 is shown to occupy a middle portion of the display 1202. Therefore, the video of the subject 1210 corresponding to a camera view of the camera 20 (associated with the graphical element 1230a) is presented at the display 1202. Also, the user interface 1206 provide a user interface elements 1240, 1242 (such as play and pause tabs) and a time line 1244 for controlling the video of the subject 1210.

The video of the subject 1210 can be changed with respect to another camera view, which is shown and explained in conjunction with the FIG. 13. Specifically, the user can move the finger 1220 on the display 1202 freely, for example, in a direction D (towards bottom left corner of the display 1202, as shown in FIG. 12A) to alter the video of the subject 1210 to another camera view associated with another graphical element. As shown in FIG. 12B, upon dragging the finger 1202 in the direction D (shown in FIG. 12A) causes rotation of the mesh of graphical elements 1230 with the finger 1220 movement. Therefore, dragging the finger 1220 in the direction D causes the graphical element 1230c (instead of the graphical element 1230a as shown in FIG. 12A) to occupy the middle portion of the display 1202. Accordingly, the video of the subject 1210 corresponding to a camera view of the camera 27 (associated with the graphical element 1230c) is presented at the display 1202. Further, using the user interface elements 1240, 1242, 1244 the video can be controlled.

Referring now to FIGS. 13A & 13B, shown are schematic illustrations for determining or defining a middle portion of a display of a user device, in accordance with various embodiments of the present disclosure. Specifically, FIGS. 13A & 13B illustrate displays 1302 and 1304, respectively, of a user device. As shown, the display 1302 includes a square shape and divided into a plurality of small segments (for example 9 segments), i.e. into a 3×3 matrix. Therefore, the segment number 5 defines the middle portion the display 1302. Accordingly, the segment number 5, which is the middle portion the display 1302, corresponds to a selection of a graphical element based on which a video with a specific camera view is selected from a plurality of videos. The display 1304 includes a rectangle shape and divided into plurality of small segments (15 segments), i.e. into a 3×5 matrix. Therefore, the segment number 8 defines the middle portion of the display 1304.

Referring now to FIG. 14, steps of a method 1400 for managing a video of a camera setup having a plurality of cameras is shown, in accordance with an embodiment of the present disclosure.

At step 1402, a mesh of graphical elements is rendered at a display on top of an active video. The mesh of graphical elements arranged on a surface representing positions of the cameras in a co-ordinate system.

At step 1404, the active video is played from a set of videos originating from the plurality of cameras. The active video corresponds to a graphical element, associated with a camera, which is in a middle portion the display.

The steps 1402 and 1404 are only illustrative and other alternatives can also be provided where one or more steps are added, one or more steps are removed, or one or more steps are provided in a different sequence without departing from the scope of the claims herein. For example, the method 1400 further includes altering the active video with respect to another graphical element, associated with another camera, which will be the middle portion of the display. Specifically, the active video is altered from a first video to a second video, when a user moves the rendered mesh of graphical elements in a way that a first graphical element associated with a first camera configure to provide the first video is shifted from the middle portion with a second graphical element associated with a second camera configure to provide the second video.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for managing a set of videos originating from a camera setup having a plurality of cameras, the system comprising:
   a server communicably coupled to the plurality of cameras and to a user device by a communication network, the server being operable to
      receive an active video originating from at least one camera of the camera setup and
      provide the active video and camera position information to the user device to be rendered on a display of the user device;
   a user device operable to
      render a mesh of graphical elements superposable on the active video, the graphical elements being arranged on a virtual surface representing positions of the plurality of cameras in a co-ordinate system at positions of corresponding cameras, respectively, and
      superpose the mesh of graphical elements and the active video on the display of the user device;
   a set of sensors operable to measure orientation of at least a first, a second and a third camera of the plurality of cameras, wherein the sensors of the set of sensors are installed in the at least first, second and third camera of the plurality of cameras,
   wherein the server is operable to:
      determine a direction of view of the at least first, second and third camera of the plurality of cameras using the measured orientation,
      make a first iteration of relative positions of the at least first, second and third camera of the plurality of cameras based on the determined direction,
      measure relative distances between the at least first, second and third camera of the plurality of cameras,
      make a second iteration of relative positions of the at least first, second and third camera of the plurality of cameras based on the measured relative distances, and
      determine the relative positions of the at least first, second and third camera of the plurality of cameras with respect to each other using the first iteration and the second iteration;
   wherein the at least one camera is associated with the graphical element located in a middle portion of the display.

2. A system according to claim 1, wherein the server is further operable to alter the active video from a first video to a second video, when a user moves the rendered mesh of graphical elements in a way that a first graphical element representing the position of a first camera providing the first video is shifted from the middle portion and replaced with a second graphical element representing the position of a second camera providing the second video.

3. A system according to claim 1, wherein the active video includes one of a live video content and a recorded video content.

4. A system according to claim 1, wherein the virtual surface representing the positions of the plurality of cameras in the co-ordinate system has a shape which includes at least one of a dome, a sphere, a hemisphere, a cylinder, an oval, a circle, a polygon and a combination thereof.

5. A system according to claim 1, wherein the graphical element located in the middle portion of the display is transparent.

6. A system according to claim 1, wherein the graphical element located in the middle portion of the display is located at a position overlapping with a subject.

7. A method for managing a set of videos originating from a camera setup having a plurality of cameras, the method comprising:
   rendering a mesh of graphical elements on a display of a user device, the graphical elements being arranged on a virtual surface representing positions of the plurality of cameras in a co-ordinate system at positions of corresponding cameras, respectively;
   playing an active video originating from at least one camera of the camera setup on the display;
   determining relative positions of the plurality of cameras with respect to each other within the camera setup, comprising:
      measuring orientation of at least a first, a second and a third camera of the plurality of cameras,
      using the measured orientation to determine a direction of view of the at least first, second and third camera of the plurality of cameras,
      making a first iteration of the relative positions of the at least first, second and third camera of the plurality of cameras based on the determined direction,
      measuring relative distances between the at least first, second and third camera of the plurality of cameras,
      making a second iteration of the relative positions of the at least first, second and third camera of the plurality of cameras based on the measured relative distances, and
      using the first iteration and the second iteration to determine the relative positions of the at least first, second and third camera of the plurality of cameras with respect to each other,
   wherein the mesh of graphical elements and the active video are superposed on the display, and the active video originates from the at least one camera, which at least one camera is associated with the graphical element located in a middle portion of the display.

8. A method according to claim 7, further comprising altering the active video from a first video to a second video when a user moves the rendered mesh of graphical elements in a way that a first graphical element representing the position of a first camera configured to provide the first video is shifted from the middle portion and replaced with a second graphical element representing the position of a second camera configured to provide the second video.

9. A method according to claim 7, wherein the active video includes one of a live video content and a recorded video content.

10. A method according to claim 7, wherein the virtual surface representing the positions of the plurality of cameras in the co-ordinate system has a shape which includes at least one of a dome, a sphere, a hemisphere, a cylinder, an oval, a circle, a polygon and a combination thereof.

11. A method according to claim 7, wherein the first iteration is based on assuming the orientation of the at least first, second and third camera of the plurality of cameras is towards a subject.

12. A method according to claim 7, wherein the measured relative distances are based on calculating received signal strength indicator values between the at least first, second and third camera of the plurality of cameras.

13. A method according to claim 7, wherein the second iteration is based on comparing the measured relative distances to theoretical distances between the at least first, second and third camera of the plurality of cameras.

14. A method according to claim 7, wherein the graphical element located in the middle portion of the display is transparent.

15. A method according to claim 7, wherein the graphical element located in the middle portion of the display is located at a position overlapping with a subject.

16. A method for managing a set of videos originating from a camera setup having a plurality of cameras, the method comprising:
rendering a mesh of graphical elements on a display of a user device, the graphical elements being arranged on a virtual surface representing positions of the plurality of cameras in a co-ordinate system at positions of corresponding cameras, respectively;
playing an active video originating from at least one camera of the camera setup on the display; and
determining relative positions of the plurality of cameras with respect to each other within the camera setup, comprising the steps of:
measuring orientation of at least a first, a second and a third camera of the plurality of cameras,
using the measured orientation to determine a direction of view of the at least first, second and third camera of the plurality of cameras,
making a first iteration of the relative positions of the at least first, second and third camera of the plurality of cameras based on the determined direction,
measuring relative distances between the at least first, second and third camera of the plurality of cameras,
making a second iteration of the relative positions of the at least first, second and third camera of the plurality of cameras based on the measured relative distances, and
using the first iteration and the second iteration to determine the relative positions of the at least first, second and third camera of the plurality of cameras with respect to each other,
wherein the mesh of graphical elements and the active video are superposed on the display, and the active video originates from the at least one camera, which at least one camera is associated with the graphical element located in a middle portion of the display, wherein the second iteration is based on comparing the measured relative distances to theoretical distances between the at least first, second and third camera of the plurality of cameras, wherein the theoretical distances are calculated from theoretical locations of cameras in respect to a geometrical shape of the camera setup.

17. A method according to claim 16, further comprising altering the active video from a first video to a second video when a user moves the rendered mesh of graphical elements in a way that a first graphical element representing the position of a first camera configured to provide the first video is shifted from the middle portion and replaced with a second graphical element representing the position of a second camera configured to provide the second video.

18. A method according to claim 16, wherein the active video includes one of a live video content and a recorded video content.

19. A method according to claim 16, wherein the virtual surface representing the positions of the plurality of cameras in the co-ordinate system has a shape which includes at least one of a dome, a sphere, a hemisphere, a cylinder, an oval, a circle, a polygon and a combination thereof.

20. A method according to claim 16, wherein the graphical element located in the middle portion of the display is transparent.

21. A method according to claim 16, wherein the graphical element located in the middle portion of the display is located at a position overlapping with a subject.

* * * * *